United States Patent
Zeng et al.

(10) Patent No.: US 10,750,457 B2
(45) Date of Patent: Aug. 18, 2020

(54) DEVICES AND METHODS FOR FACILITATING MULTIPLE SYNCHRONIZATION CHANNELS WITHIN A SINGLE CARRIER

(71) Applicant: QUALCOMM Incorporated, San Diego, CA (US)

(72) Inventors: Wei Zeng, San Diego, CA (US); Wanshi Chen, San Diego, CA (US); Tingfang Ji, San Diego, CA (US); Peter Gaal, San Diego, CA (US); Hung Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/490,830

(22) Filed: Apr. 18, 2017

(65) Prior Publication Data
US 2018/0092056 A1    Mar. 29, 2018

Related U.S. Application Data

(60) Provisional application No. 62/400,010, filed on Sep. 26, 2016.

(51) Int. Cl.
*H04L 12/50* (2006.01)
*H04W 56/00* (2009.01)
(Continued)

(52) U.S. Cl.
CPC ......... *H04W 56/0005* (2013.01); *H04L 5/005* (2013.01); *H04L 5/0053* (2013.01);
(Continued)

(58) Field of Classification Search
CPC ....................................................... H04L 12/28
(Continued)

(56) References Cited

U.S. PATENT DOCUMENTS

| 8,743,855 B2 * | 6/2014 | Han ................. | H04J 11/003 370/310 |
| 2004/0028121 A1 * | 2/2004 | Fitton ................. | H04B 1/7107 375/144 |

(Continued)

OTHER PUBLICATIONS

ETRI: "Band-Agnostic Initial Access for NR", 3GPP Draft; R1-166944, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 21, 2016, XP051140449, Retrieved from the Internet: URL:http://www.3gpp.org/ftp/Meetings_3GPP_SYNC/RAN1/Docs/ [retrieved on Aug. 21, 2016], 4 pages.

(Continued)

*Primary Examiner* — Dang T Ton
(74) *Attorney, Agent, or Firm* — Kevin M. Donnelly; Loza & Loza, LLP

(57) ABSTRACT

Wireless communication devices are adapted to facilitate multiple synchronization channels within a single carrier. In some examples, an apparatus for wireless communication may transmit a first synchronization channel at a first frequency in a carrier bandwidth, and at least one additional synchronization channel at a different respective frequency in the carrier bandwidth. In some examples, an apparatus for wireless communication may scan a carrier bandwidth for one of a plurality of synchronization channels conveyed at different respective frequencies in the carrier bandwidth, and discover a synchronization channel from among the plurality of synchronization channels. The apparatus may further receive information conveyed over the discovered synchronization channel and utilize the information to access the carrier. Other aspects, embodiments, and features are also included.

26 Claims, 9 Drawing Sheets

(51) Int. Cl.
*H04L 5/00* (2006.01)
*H04W 72/04* (2009.01)

(52) U.S. Cl.
CPC ........ *H04W 56/00* (2013.01); *H04W 72/0413* (2013.01); *H04W 72/0453* (2013.01)

(58) Field of Classification Search
USPC .......................................................... 370/329
See application file for complete search history.

(56) References Cited

U.S. PATENT DOCUMENTS

| | | | |
|---|---|---|---|
| 2013/0083753 A1* | 4/2013 | Lee ................... | H04W 74/0833 370/329 |
| 2014/0010184 A1 | 1/2014 | McNamara et al. | |

OTHER PUBLICATIONS

Huawei, et al., "Access Mechanism for Beam Based Approach," 3GPP Draft, R1-166088, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 12, 2016, XP051132464, Retrieved from the Internet: http://www.3gpp.org/ftp/tsg_ran/WG1_RL1/TSGR1_86/Docs/ [retrieved on Aug. 12, 2016].
International Search Report and Written Opinion—PCT/US2017/047806—ISA/EPO—dated Nov. 10, 2017.
Nokia et al., "On System Design for Multiple Numerologies-Initial Access", 3GPP Draft; R1-167258, 3rd Generation Partnership Project (3GPP), Mobile Competence Centre ; 650, Route Des Lucioles; F-06921 Sophia-Antipolis Cedex; France, vol. RAN WG1, No. Gothenburg, Sweden; Aug. 21, 2016, XP051125795, Retrieved from the Internet: URL:http://www.3gpp.org/ftp/Meetings_3GPP_SYNC/RAN1/Docs/, [retrieved on Aug. 21, 2016], 6 pages.

* cited by examiner

DEVICES AND METHODS FOR FACILITATING MULTIPLE SYNCHRONIZATION CHANNELS WITHIN A SINGLE CARRIER

PRIORITY CLAIM

The present Application for Patent claims priority to Provisional Application No. 62/400,010 entitled "Devices and Methods for Facilitating Multi-Cluster Synchronization Channels Within a Single Carrier" filed Sep. 26, 2016, and assigned to the assignee hereof and hereby expressly incorporated by reference herein.

TECHNICAL FIELD

The technology discussed below relates generally to wireless communications, and more specifically to methods and devices for facilitating a plurality of synchronization channels for a single carrier.

INTRODUCTION

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power).

As the demand for mobile broadband access continues to increase, research and development continue to advance wireless communication technologies not only to meet the growing demand for mobile broadband access, but to advance and enhance the user experience with mobile communications. For example, the third generation partnership project (3GPP) is an organization that develops and maintains telecommunication standards for fourth generation (4G) long-term evolution (LTE) networks. Recently, the 3GPP has begun the development of a next-generation evolution of LTE, which generally corresponds to a fifth generation (5G) new radio (NR) network. As it stands today, 5G NR networks may exhibit a higher degree of flexibility and scalability than LTE, and are envisioned to support very diverse sets of requirements. Therefore, an efficient and flexible manner for a device to determine various aspects of the network upon acquisition is desired.

When a wireless communication device acquires a connection with a telecommunication network, it is generally required for the device to make certain determinations about the nature of the network so that the device can function in that network. Over time, a particular wireless communication device might acquire such connections on a variety of different networks having a broad range of configurations, so these determinations may be made regularly. Thus, there is a desire for these processes to be as efficient as practicable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate a plurality of synchronization channels in a single bandwidth frequency for wireless communications systems.

In at least one aspect of the present disclosure, apparatus for wireless communications are provided. In at least one example, such apparatus may include a transceiver, a memory, and a processing circuit coupled to the transceiver and the memory. The processing circuit may be configured to transmit via the transceiver a first synchronization channel at a first frequency in a carrier bandwidth. The processing circuit may be further configured to transmit via the transceiver one or more additional synchronization channels, where each of the one or more additional synchronization channels is transmitted at a respective frequency in the carrier bandwidth. Each of the first synchronization channel and the one or more additional synchronization channels are transmitted at different respective frequencies in the carrier bandwidth.

Further aspects provide methods operational on apparatus for wireless communication and/or apparatus for wireless communication including means to perform such methods. One or more examples of such methods may include transmitting a first synchronization channel at a first frequency in a carrier bandwidth, and transmitting one or more additional synchronization channels. Each of the first synchronization channel and the one or more additional synchronization channels can be transmitted at different respective frequencies in the carrier bandwidth.

Still further aspects of the present disclosure include computer-readable storage mediums storing processor-executable programming. In at least one example, the processor-executable programming may be adapted to cause a processing circuit to transmit a first synchronization channel at a first frequency in a carrier bandwidth, and transmit one or more additional synchronization channels, where each of the first synchronization channel and the one or more additional synchronization channels is transmitted at different respective frequencies in the carrier bandwidth.

Additional aspects of the present disclosure include apparatus for wireless communication. According to one or more examples, such apparatus may include a transceiver, a memory, and a processing circuit coupled to the transceiver and the memory. The processing circuit may be configured to scan via the transceiver a carrier bandwidth for one of a plurality of synchronization channels, where each of the plurality of synchronization channels are conveyed at different respective frequencies in the carrier bandwidth. The processing circuit may be further configured to discover a synchronization channels from among the plurality of synchronization channels associated with the carrier bandwidth. The processing circuit may be further configured to receive via the transceiver information conveyed over the discovered synchronization channel, and to utilize the received information to access the carrier.

Yet additional aspects provide methods operational on apparatus for wireless communication and/or apparatus for wireless communication including means to perform such methods. One or more examples of such methods may include scanning a carrier bandwidth for one of a plurality of synchronization channels, where each of the plurality of synchronization channels are conveyed at different respective frequencies in the carrier bandwidth. One of the plurality of synchronization channels associated with the carrier bandwidth may be discovered, and information conveyed over the discovered synchronization channel may be received. The received information can be utilized to access the carrier.

Still further aspects of the present disclosure include computer-readable storage mediums storing processor-executable programming In at least one example, the processor-executable programming may be adapted to cause a processing circuit to scan a carrier bandwidth for one of a plurality of synchronization channels, where each of the plurality of synchronization channels are conveyed at different respective frequencies in the carrier bandwidth. The processor-executable programming may further be adapted to cause a processing circuit to discover one of the plurality of synchronization channels associated with the carrier bandwidth, receive information conveyed over the discovered synchronization channel, and utilize the received information to access the carrier.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

Figure 1:
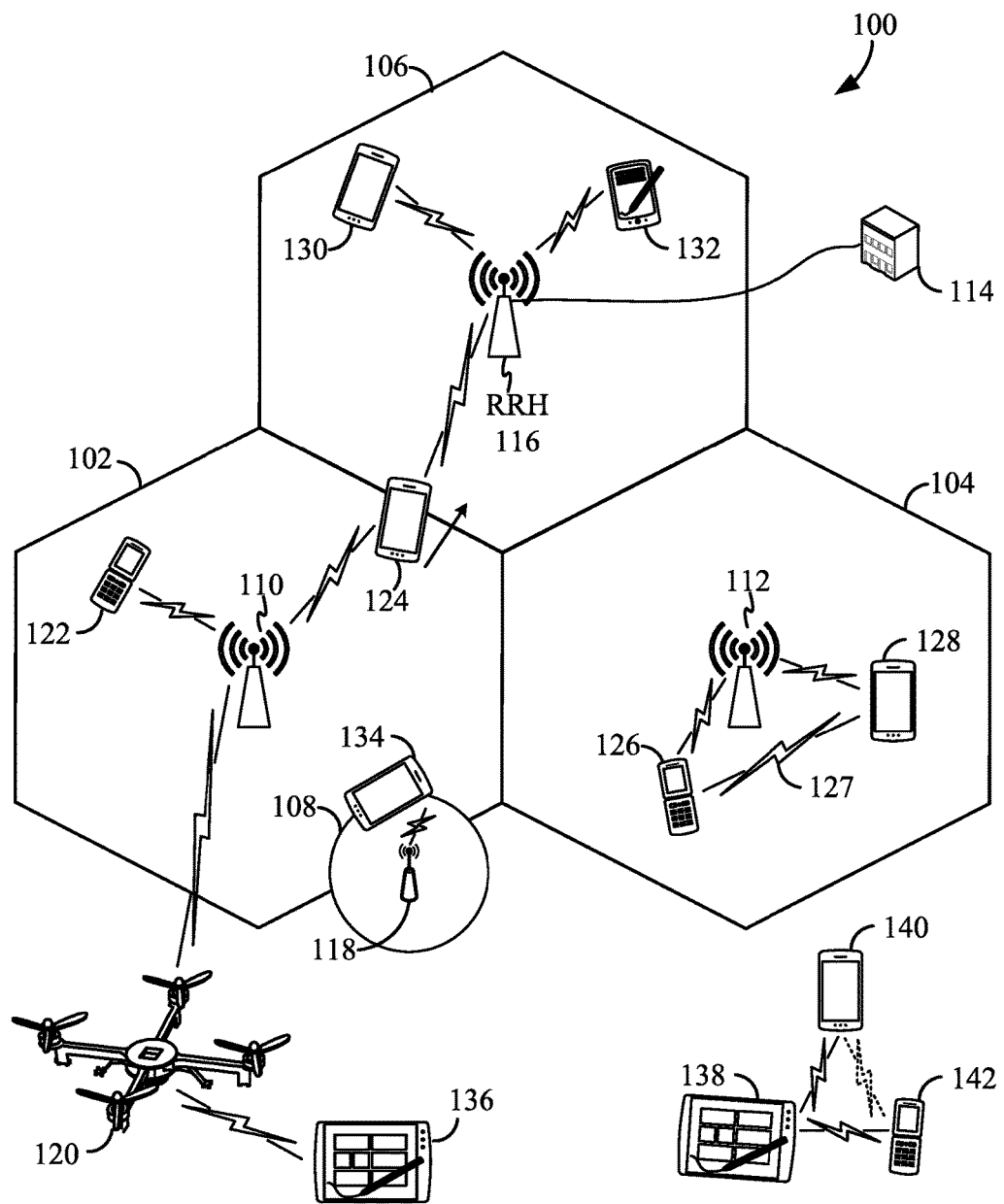
FIG. 1 is a block diagram of a network environment in which one or more aspects of the present disclosure may find application.

The various concepts presented throughout this disclosure may be implemented across a broad variety of telecommunication systems, network architectures, and communication standards. Referring now to FIG. 1, as an illustrative example without limitation, a block diagram of a network environment in which one or more aspects of the present disclosure may find application is provided. The access network 100 is adapted to facilitate wireless communication between two or more wireless communication devices.

The geographic region covered by the access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A base station may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNB, or some other suitable terminology.

In FIG. 1, two high-power base stations 110 and 112 are shown in cells 102 and 104, and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the access network 100, the cells may include UEs that may be in communication with one or more sectors of each cell. For example, UEs 122 and 124 may be in communication with base station 110, UEs 126 and 128 may be in communication with base station 112, UEs 130 and 132 may be in communication with base station 114 by way of RRH 116, UE 134 may be in communication with low-power base station 118, and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quad-copter 120) may be configured to function as a UE. For example, the quadcopter 120 may operate within cell 102 by communicating with base station 110. In some aspects of the disclosure, two or more UEs (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Thus, in a wireless communication network with scheduled access to time—frequency resources and having a cellular configuration, a P2P configuration, or a mesh configuration, a scheduling entity and one or more scheduled entities may communicate utilizing the scheduled resources.

Figure 2:
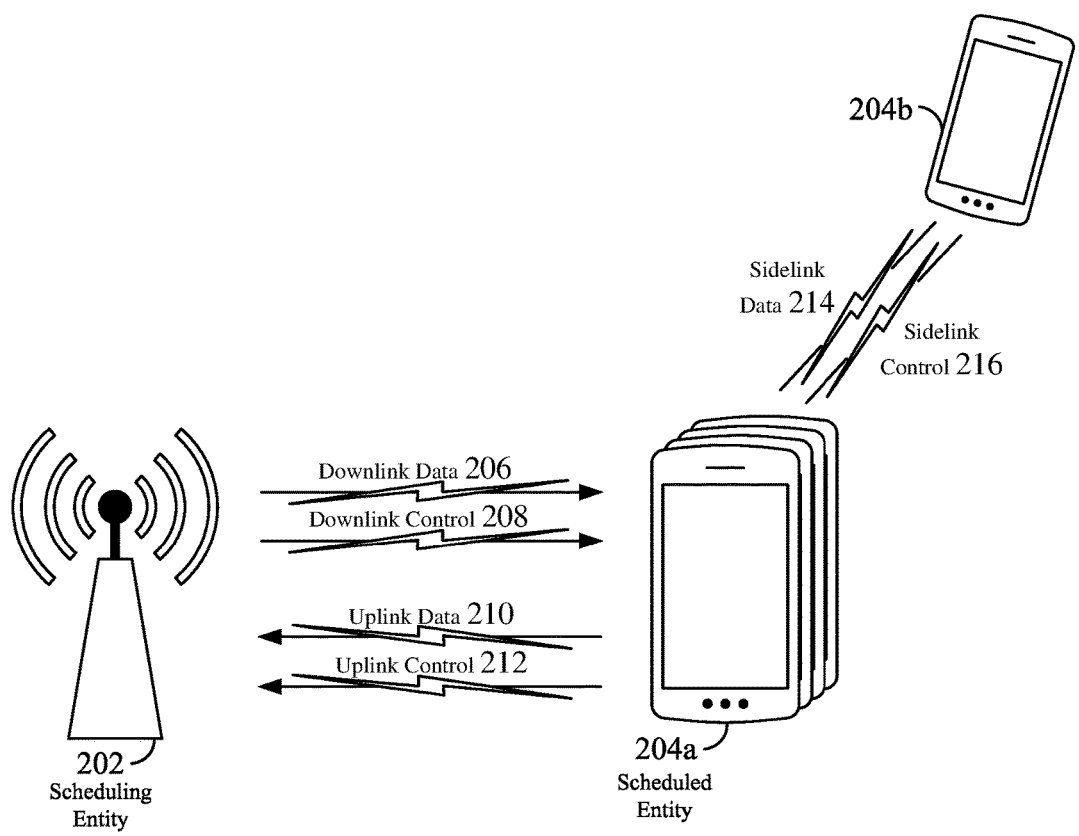
FIG. 2 is a block diagram conceptually illustrating an example of a scheduling entity communicating with one or more scheduled entities according to some embodiments.

Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH, a PSS, a SSS, a physical control format indicator channel (PCFICH), a physical hybrid automatic repeat request (HARQ) indicator channel (PHICH), and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal, and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

In some examples, the scheduling entity 202 (e.g., base stations 110, 112, and 114/116) may broadcast unified synchronization signals (e.g., unified Primary Synchronization Signal (PSS), unified Secondary Synchronization Signal (SSS) and unified Physical Broadcast Channel (PBCH)). The scheduled entity 204 (e.g., UEs 122, 124, 126, 128, 130, and 132) may receive the unified synchronization signals, derive the carrier frequency and slot timing from the synchronization signals, and in response to deriving timing, transmit an uplink pilot or reference signal. The uplink pilot signal transmitted by a UE may be concurrently received by two or more cells within the access network 100. Each of the cells may measure a strength of the pilot signal, and the access network (e.g., one or more of the base stations 110 and 114/116 and/or a central node within the core network) may determine a serving cell for the UE.

Although the synchronization signal transmitted by the scheduling entity 202 may be unified, the synchronization signal may not identify a particular cell, but rather may identify a zone of multiple cells operating on the same frequency and/or with the same timing. The use of zones in 5G networks or other next generation communication networks enables uplink-based mobility framework and improves the efficiency of both the UE and the network, since the number of mobility messages that need to be exchanged between the UE and the network may be reduced.

Figure 3:
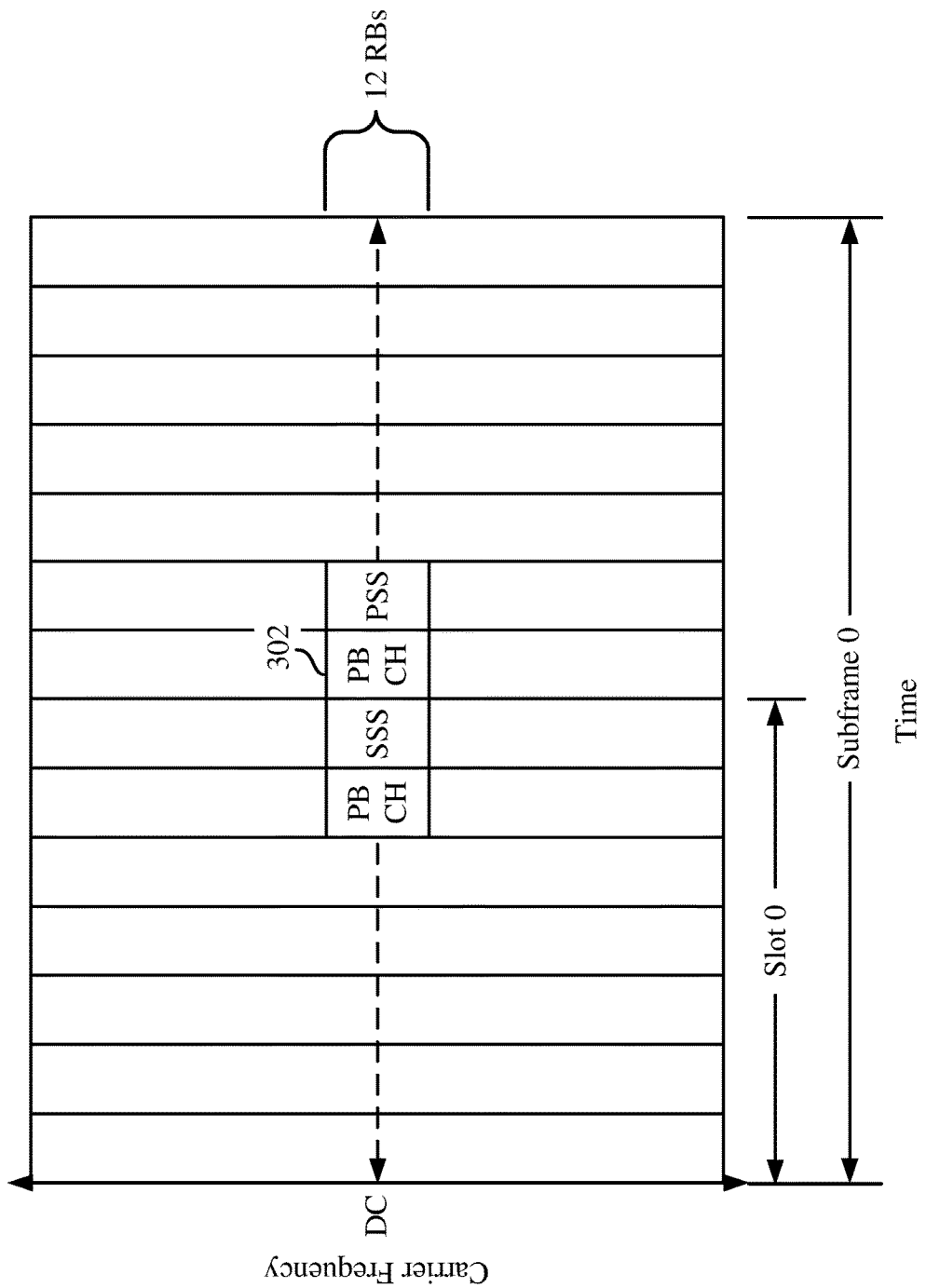
FIG. 3 is a schematic diagram generally illustrating a typical frame structure for a 5G communication system according to at least one example.

In some wireless communication systems, a base station broadcasts synchronization signals (e.g., SSS, PSS) at a single frequency location across several resource blocks (RBs). In LTE communication systems, the synchronization signals are broadcast across six RBs positioned around the center of the carrier frequency. In some 5G communication systems, the synchronization signals are sent across twelve RBs. FIG. 3 is a schematic diagram generally showing a typical frame structure for a 5G communication system according to at least one example. The horizontal axis is time domain and the vertical axis is frequency domain. The diagram depicts one subframe, where the subframe includes two slots and each slot includes seven symbols. As depicted in the example, a synchronization signal block 302 is broadcast over twelve resource blocks, at the center (DC) of the carrier frequency. The synchronization signal block 302 can include a PSS in one symbol, a SSS in one symbol, and a PBCH in two symbols as depicted. In the illustrated example, the synchronization signal block 302 is located at the center DC. However, in some embodiments, the synchronization signal block 302 may be transmitted at a different frequency from the center DC. For instance, a synchronization signal block 302 may be transmitted around a predetermined synchronization signal frequency.

Typically, each carrier employs just a single frequency for the synchronization channel on which the PSS and SSS are transmitted, as well as PBCH. When a scheduled entity 204 initially accesses a carrier, the device will typically search for the synchronization channel For instance, the scheduled entity 204 may sweep the synchronization channel frequencies for the carrier, which synchronization channel frequencies are defined by the synchronization channel raster (e.g., synchronization channel frequencies may be an integer multiple of the synchronization channel raster). For LTE, the synchronization channel raster is the same as the channel raster, which are typically 100 KHz. For at least some 5G networks, the synchronization channel raster may be around 4 MHz in at least one example.

It is envisioned that at least some 5G networks may utilize carriers with relatively large bandwidth. For instance, a carrier's bandwidth may potentially be hundreds of megahertz (MHz) or more. In such implementations where the bandwidth is relatively large, searching through the synchronization channel frequencies at the synchronization channel raster, such as every 4 MHz, to find the single synchronization channel can take a relatively long amount of time. For example, it may occur that a UE starts searching for the synchronization channel in synchronization channel frequencies over which no synchronization channel is sent. In the worst case, the synchronization channel is sent over the synchronization channel frequency that is at the last of a list of synchronization channel frequencies that a UE needs to search.

Figure 4:
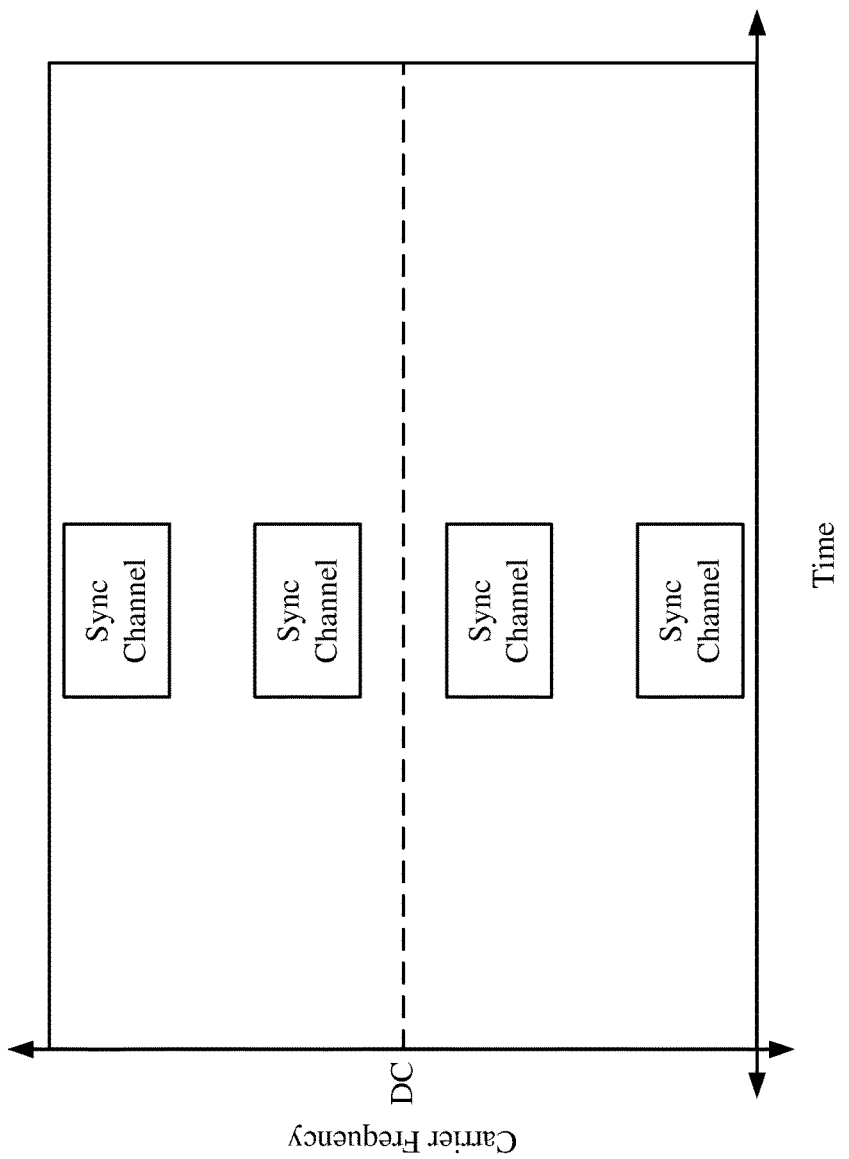
FIG. 4 is a schematic diagram generally showing an example of a frame with a plurality of synchronization channels according to at least one aspect of the present disclosure.

According to an aspect of the present disclosure, wireless communication devices are configured to utilize a plurality of synchronization channels within a single carrier. For example, a scheduling entity may transmit synchronization channels in more than one frequency on a single carrier, and a scheduled entity may search a carrier for one of the plurality of synchronization channels to obtain information to be utilized in connecting to the network on the carrier. FIG. 4 is a schematic diagram generally showing an example of a frame with a plurality of synchronization channels according to at least one aspect of the present disclosure. In the depicted example, the scheduling entity is utilizing four different frequency locations for the synchronization channel. However, different implementations may utilize different numbers of synchronization channels for a carrier, so long as there are more than just one synchronization channel According to an aspect of the present disclosure, each synchronization channel includes at least the PSS and SSS, and may also include the PBCH. In examples where the PBCH is included in the synchronization channel, the PBCH may or may not be centered about the synchronization channel frequency, even though it is sent together with the PSS and SSS.

By transmitting the synchronization channel in multiple frequencies, a scheduled entity searching for a synchronization channel will be more likely to find one. By detecting just one frequency location for the synchronization channel, the scheduled entity can obtain all information necessary to access the network without identifying additional frequencies for the synchronization channels.

The information transmitted by the scheduling entity on the synchronization channels can include information to enable a scheduled entity to obtain frequency synchronization, timing synchronization, and/or the physical cell or zone ID. In some implementations, such information may be transmitted utilizing the PSS and the SSS. In some examples, a third synchronization signal may also be transmitted on the synchronization channels. Such a synchronization signal may be referred to as a tertiary synchronization signal or TSS. The TSS may include the beam ID. With a PSS, SSS, and TSS, the synchronization channels can provide all necessary information for beam synchronization, symbol timing synchronization, frame timing synchronization, frequency synchronization and physical cell or zone ID. The information obtained by the different synchronization signals in a synchronization channel can enable a receiving device, such as a scheduled entity, to decode a master information block (MIB) carried in a physical broadcast channel (PBCH). From the PBCH, the scheduled entity can obtain information such as the location of the center of the carrier bandwidth and where to obtain the system information block (SIB) carried in a PDCCH/PDSCH.

In at least some implementations, the system information may include information about the frequencies where the other synchronization channels are located for the carrier. The system information may further include an indication whether the scheduled entity is authorized to send uplink signals in the other synchronization channels.

Figure 5:
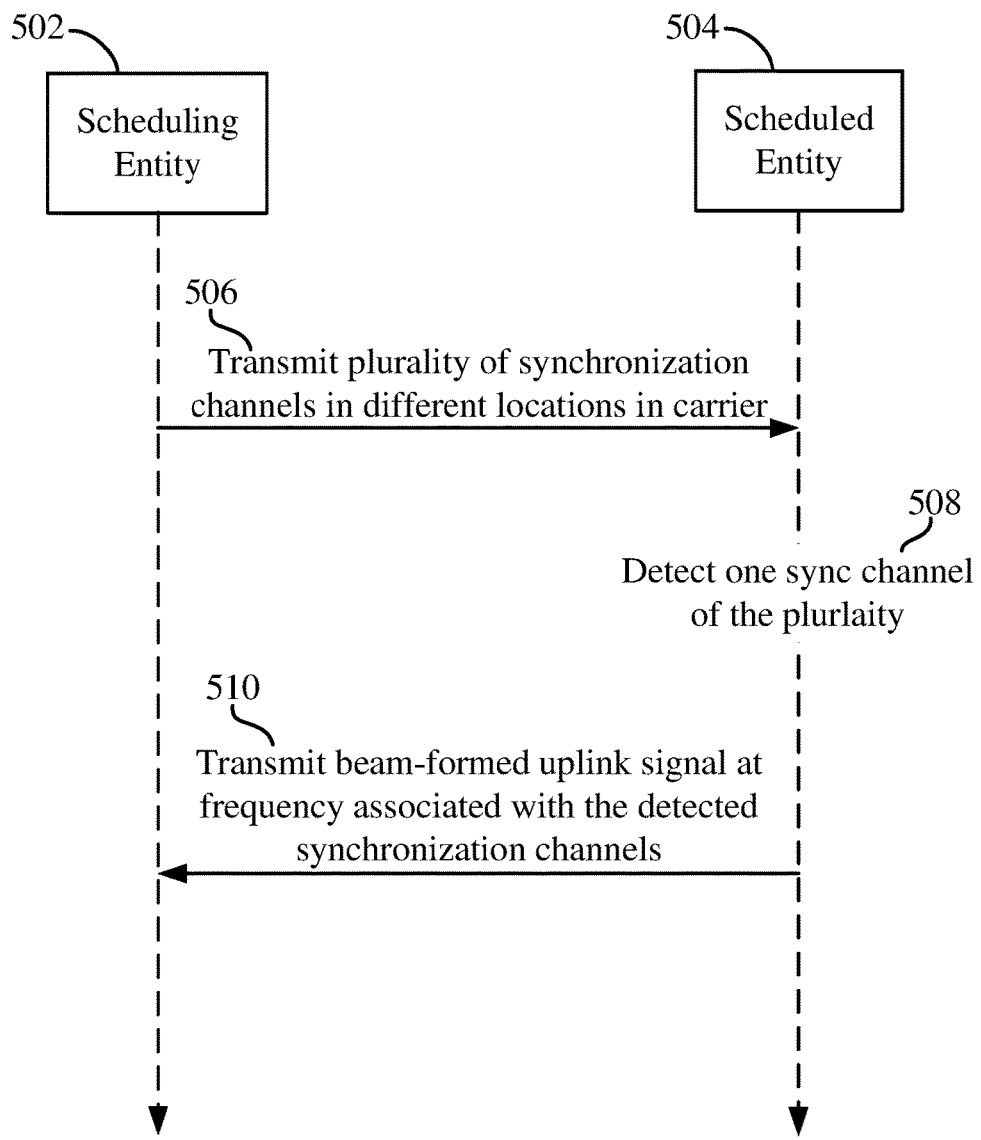
FIG. 5 is a flow diagram illustrating an example communication flow between wireless communication devices, such as a scheduling entity and a scheduled entity.

In certain scenarios, such as in millimeter wave (mmW) communications, a device may be ready to send a beamformed uplink signal (e.g., a chirp, a physical random access channel (PRACH) signal) based on channel reciprocity. Typically, the device measures the downlink channel using a synchronization channel or reference signals located at the same frequency as the synchronization channel The device calculates uplink beam-forming pre-coder based on the downlink channel estimation. Due to reciprocity, the device is configured to send the uplink signal at the same frequency. The corresponding uplink signal capacity is accordingly limited by this single synchronization channel According to at least one aspect of the present disclosure, wireless communication devices, such as scheduled entities, are configured to utilize frequencies associated with any of the plurality of synchronization channels to transmit uplink signals. For example, FIG. 5 is a flow diagram illustrating an example communication flow between wireless communication devices, such as a scheduling entity 502 and a scheduled entity 504. As depicted, a scheduling entity 502 can transmit a plurality of synchronization channels 506 in different frequencies in a single carrier. The scheduled entity can search for and detect 508 one of the plurality of synchronization channels. As noted above, detection of just one of the plurality of synchronization channels is sufficient to provide information to enable the scheduled entity 504 to access the network. The scheduled entity 504 subsequently sends an uplink signal 510 at a frequency associated with the detected synchronization channel, such as on a PRACH associated with the detected synchronization channel. Similarly, another scheduled entity can send a beam-formed uplink signal at another frequency associated with another of the plurality of synchronization channels at the same time that the scheduled entity 504 is sending its uplink signal 510. By enabling all of the plurality of synchronization channels to be utilized for uplink signals, the capacity is significantly increased.

As noted above, the scheduled entity 504 may obtain system information from a PDCCH/PDSCH indicating the frequencies where the other synchronization channels are located for the carrier. The system information may indicate whether the scheduled entity 504 is authorized to send uplink signals in the other synchronization channels. If the scheduled entity 504 is authorized to send uplink signals on the other synchronization channels, then the scheduled entity 504 may send uplink signals 510 at a frequency associated with any of the plurality of synchronization channels.

Figure 6:
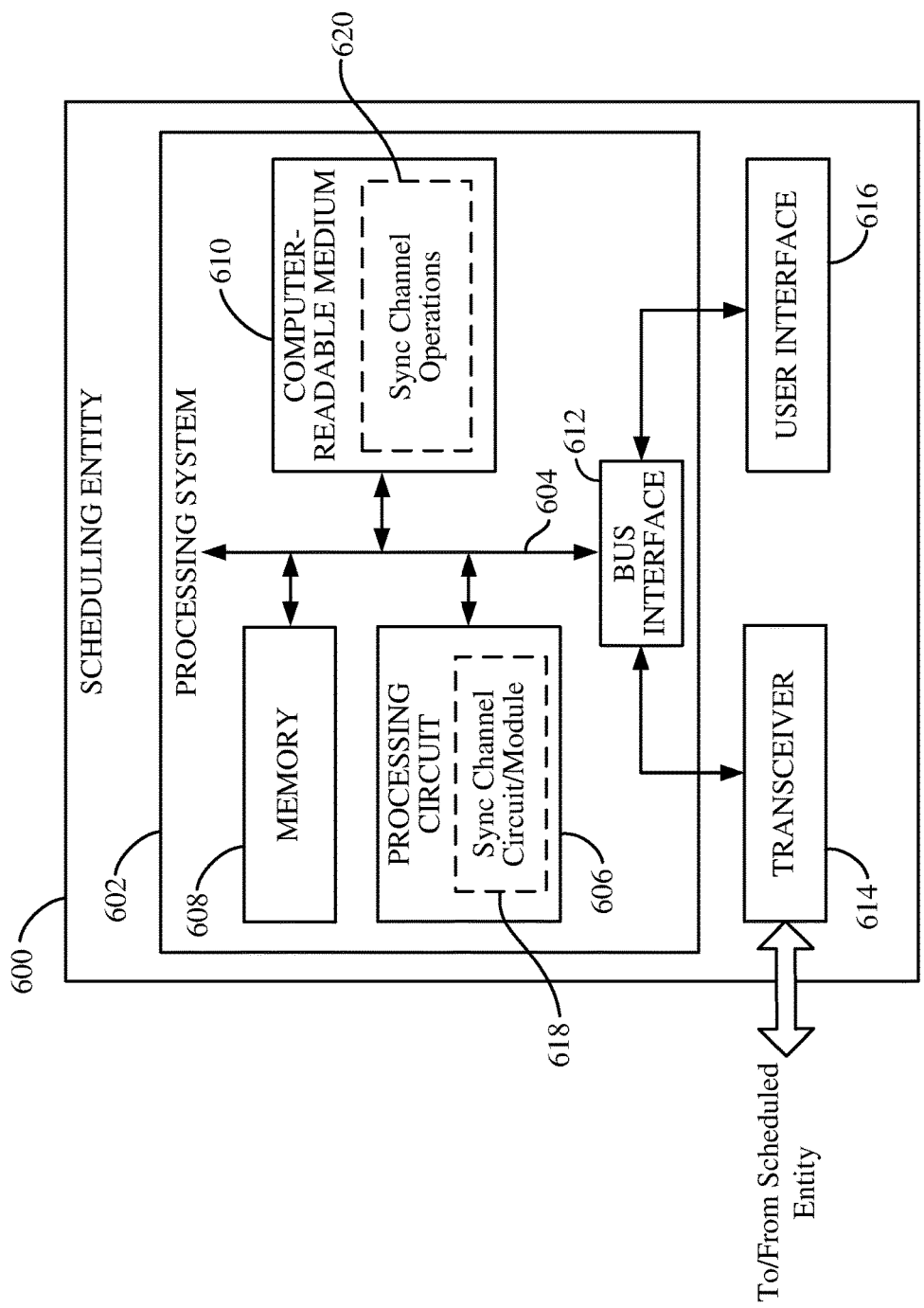
FIG. 6 is a block diagram illustrating select components of a scheduling entity according to at least one example.

FIG. 6 is a block diagram illustrating select components of a scheduling entity 600 employing a processing system 602 according to at least one example of the present disclosure. In this example, the processing system 602 is implemented with a bus architecture, represented generally by the bus 604. The bus 604 may include any number of interconnecting buses and bridges depending on the specific application of the processing system 602 and the overall design constraints. The bus 604 communicatively couples together various circuits including one or more processors (represented generally by the processing circuit 606), a memory 608, and computer-readable media (represented generally by the storage medium 610). The bus 604 may also link various other circuits such as timing sources, peripherals, voltage regulators, and power management circuits, which are well known in the art, and therefore, will not be described any further. A bus interface 612 provides an interface between the bus 604 and a transceiver 614. The transceiver 614 provides a means for communicating with various other apparatus over a transmission medium. Depending upon the nature of the apparatus, a user interface 616 (e.g., keypad, display, speaker, microphone, joystick) may also be provided.

The processing circuit 606 is responsible for managing the bus 604 and general processing, including the execution of programming stored on the computer-readable storage medium 610. The programming, when executed by the processing circuit 606, causes the processing system 602 to perform the various functions described below for any particular apparatus. The computer-readable storage medium 610 and the memory 608 may also be used for storing data that is manipulated by the processing circuit 606 when executing programming. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 606 is arranged to obtain, process and/or send data, control data access and storage, issue commands, and control other desired operations. The processing circuit 606 may include circuitry adapted to implement desired programming provided by appropriate media, and/or circuitry adapted to perform one or more functions described in this disclosure. For example, the processing circuit 606 may be implemented as one or more processors, one or more controllers, and/or other structure configured to execute executable programming and/or execute specific functions. Examples of the processing circuit 606 may include a general purpose processor, a digital signal processor (DSP), an application specific integrated circuit (ASIC), a field programmable gate array (FPGA) and/or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 606 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 606 are for illustration and other suitable configurations within the scope of the present disclosure are also contemplated.

In some instances, the processing circuit 606 may include synchronization channel circuit and/or module 618. The synchronization channel circuit/module 618 may generally include circuitry and/or programming (e.g., programming stored on the storage medium 610) adapted to manage the transmission of various synchronization signals (e.g., PSS, SSS, TSS) over a plurality of synchronization channels within a single carrier at different frequencies. As used herein, reference to circuitry and/or programming may be generally referred to as logic (e.g., logic gates and/or data structure logic).

The storage medium 610 may represent one or more computer-readable devices for storing programming, such as processor executable code or instructions (e.g., software, firmware), electronic data, databases, or other digital information. The storage medium 610 may also be used for storing data that is manipulated by the processing circuit 606 when executing programming The storage medium 610 may be any available non-transitory media that can be accessed by a general purpose or special purpose processor, including portable or fixed storage devices, optical storage devices, and various other mediums capable of storing, containing and/or carrying programming By way of example and not limitation, the storage medium 610 may include a non-transitory computer-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 610 may be coupled to the processing circuit 606 such that the processing circuit 606 can read information from, and write information to, the storage medium 610. That is, the storage medium 610 can be coupled to the processing circuit 606 so that the storage medium 610 is at least accessible by the processing circuit 606, including examples where the storage medium 610 is integral to the processing circuit 606 and/or examples where the storage medium 610 is separate from the processing circuit 606 (e.g., resident in the processing system 602, external to the processing system 602, distributed across multiple entities).

Programming stored by the storage medium 610, when executed by the processing circuit 606, can cause the processing circuit 606 to perform one or more of the various functions and/or process steps described herein. In at least some examples, the storage medium 610 may include synchronization channel operations 620. The synchronization channel operations 620 are generally adapted to cause the processing circuit 606 to manage the transmission of various synchronization signals (e.g., PSS, SSS, TSS) over a plurality of synchronization channels at different frequencies within a single carrier, as described herein. Thus, according to one or more aspects of the present disclosure, the processing circuit 606 is adapted to perform (independently or in conjunction with the storage medium 610) any or all of the processes, functions, steps and/or routines for any or all of the scheduling entities described herein (e.g., base station 110, 112, 114, 118, UE 138, quadcopter 120, scheduling entity 202, 502, 600). As used herein, the term "adapted" in relation to the processing circuit 606 may refer to the processing circuit 606 being one or more of configured, employed, implemented, and/or programmed (in conjunction with the storage medium 610) to perform a particular process, function, step and/or routine according to various features described herein.

Figure 7:
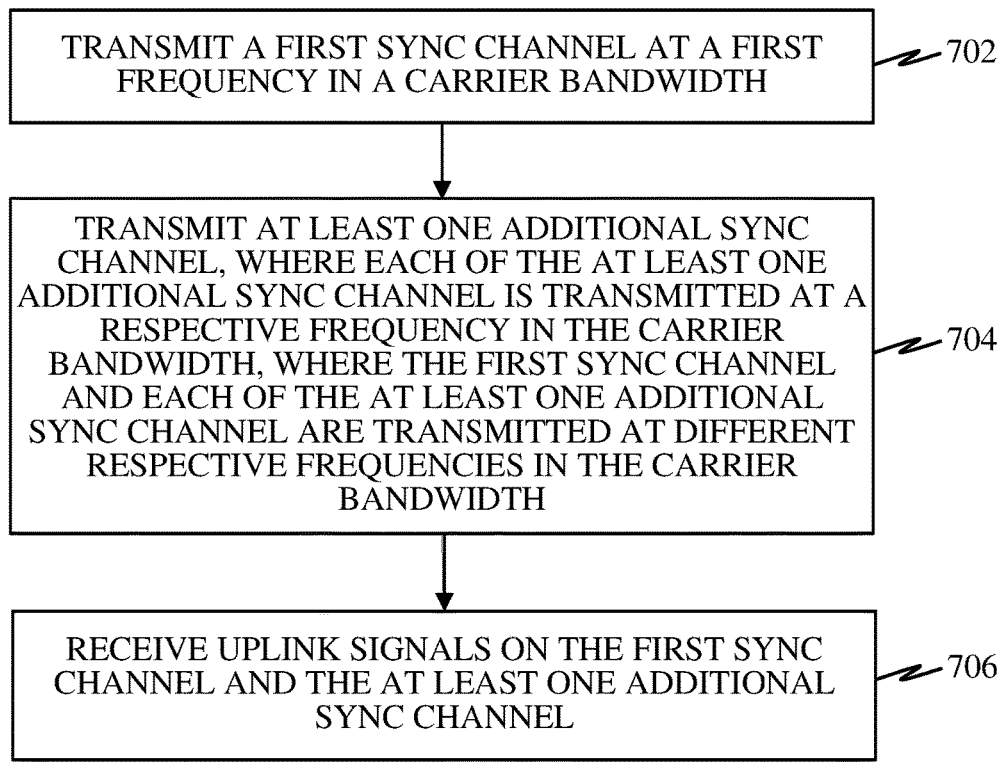
FIG. 7 is a flow diagram illustrating a method operational on a scheduling entity according to at least one example.

FIG. 7 is a flow diagram illustrating at least one example of a method operational on a scheduling entity, such as the scheduling entity 600. Referring to FIGS. 6 and 7, a scheduling entity 600 can transmit a first synchronization channel at a first frequency in a carrier bandwidth at 702. For example, the processing system 602 may include logic (e.g., synchronization channel circuit/module 618, synchronization channel operations 620) to transmit a first synchronization channel via the transceiver 614 at a first frequency in a carrier bandwidth. Transmission of the first synchronization channel may include transmission of a primary synchronization signal (PSS) and a secondary synchronization signal (SSS). In at least some implementations, transmission of the first synchronization channel may further include a tertiary synchronization signal (TSS) as noted above.

At 704, the scheduling entity 600 can transmit one or more additional synchronization channels, where each of the one or more additional synchronization channels is transmitted by the scheduling entity 600 at a respective frequency in the carrier bandwidth. For example, the processing system 602 may include logic (e.g., synchronization channel circuit/module 618, synchronization channel operations 620) to transmit at least one synchronization channel at respective frequencies in the carrier bandwidth. That is, each of the one or more additional synchronization channels are transmitted at different respective frequencies in the carrier bandwidth, and each of the respective frequencies for the one or more additional synchronization channels are different from the frequency utilized to transmit the first synchronization channel.

Similar to the first synchronization channel, the transmission of the one or more additional synchronization channels on the other frequencies of the carrier bandwidth include transmission of a primary synchronization signal (PSS) and a secondary synchronization signal (SSS). In at least some implementations, transmission of the one or more additional synchronization channels may further include transmission of a tertiary synchronization signal (TSS) as noted above. It can be stated that all of the different synchronization channels transmitted by the scheduling entity 600 include sufficient information to enable a scheduled entity to access the network without searching for another synchronization channel on the carrier.

At 706, in at least some implementations, the scheduling entity 600 may receive uplink signals on the first synchronization channel and on the at least one additional synchronization channel. For example, the processing system 602 may include logic (e.g., synchronization channel circuit/module 618, synchronization channel operations 620) to receive uplink signals via the transceiver 614 over the frequencies associated with each of the first synchronization channel and the at least one additional synchronization channel. In at least one implementation, such signals may be beam-formed signals received from a scheduled entity over a random access channel (RACH).

In at least some implementations, the scheduling entity 600 may transmit system information indicating the frequencies where each synchronization channel is located and indicating whether a scheduled entity is authorized to utilize the frequencies associated with any of the synchronization channels for uplink transmissions. For example, the processing circuit 602 may include logic (e.g., synchronization channel circuit/module 618, synchronization channel operations 620) to transmit system information on a PDCCH/PDSCH. The system information may include an indication of the respective frequency associated with each of the first synchronization channel and the at least one additional synchronization channel. The system information may further include an indication that uplink transmissions on any of the first synchronization channel and the at least one additional synchronization channel are authorized for scheduled entities.

Figure 8:
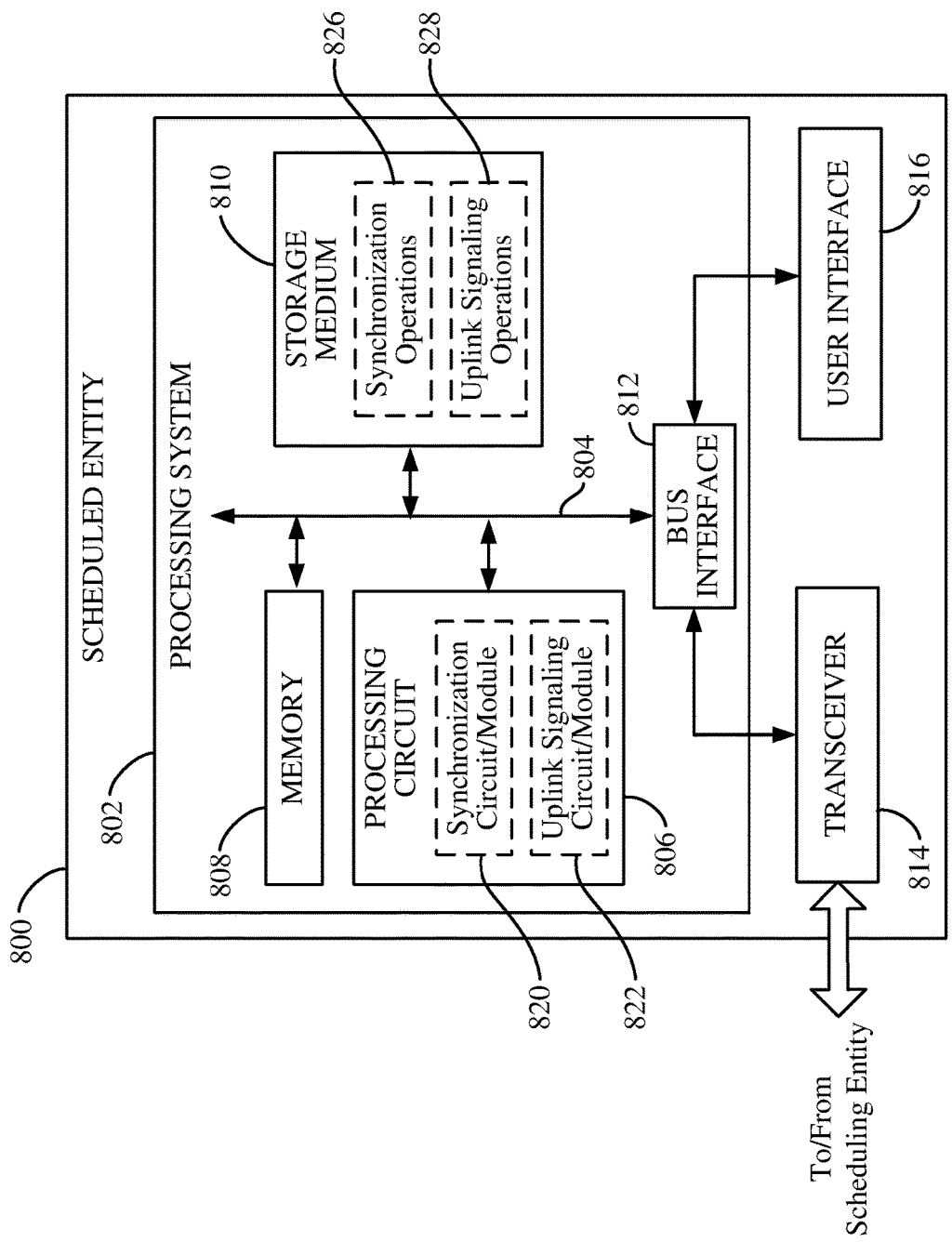
FIG. 8 is a block diagram illustrating select components of a scheduled entity according to at least one example.

Turning now to FIG. 8, a block diagram is shown illustrating select components of a scheduled entity 800 employing a processing system 802 according to at least one example of the present disclosure. Similar to the processing system 602 in FIG. 6, the processing system 802 may be implemented with a bus architecture, represented generally by the bus 804. The bus 804 may include any number of interconnecting buses and bridges depending on the specific application of the processing system 802 and the overall design constraints. The bus 804 communicatively couples together various circuits including one or more processors (represented generally by the processing circuit 806), a memory 808, and computer-readable media (represented generally by the storage medium 810). The bus 804 may also link various other circuits such as timing sources, peripherals, voltage regulators, and power management circuits, which are well known in the art, and therefore, will not be described any further. A bus interface 812 provides an interface between the bus 804 and a transceiver 814. The transceiver 814 provides a means for communicating with various other apparatus over a transmission medium. Depending upon the nature of the apparatus, a user interface 816 (e.g., keypad, display, speaker, microphone, joystick) may also be provided.

The processing circuit 806 is responsible for managing the bus 804 and general processing, including the execution of programming stored on the computer-readable storage medium 810. The programming, when executed by the processing circuit 806, causes the processing system 802 to perform the various functions described below for any particular apparatus. The computer-readable storage medium 810 and the memory 808 may also be used for storing data that is manipulated by the processing circuit 806 when executing programming The processing circuit 806 is arranged to obtain, process and/or send data, control data access and storage, issue commands, and control other desired operations. The processing circuit 806 may include circuitry adapted to implement desired programming provided by appropriate media in at least one example, and/or circuitry adapted to perform one or more functions described in this disclosure. The processing circuit 806 may be implemented and/or configured according to any of the examples of the processing circuit 606 described above.

In some instances, the processing circuit 806 may include a synchronization circuit and/or module 820 and an uplink signaling circuit and/or module 822. The synchronization circuit/module 820 may generally include circuitry and/or programming (e.g., programming stored on the storage medium 810) adapted to scan a carrier bandwidth for a synchronization channel to discover one of a plurality of synchronization channels at different frequencies in the carrier bandwidth. The uplink signaling circuit/module 822 may generally include circuitry and/or programming (e.g., programming stored on the storage medium 810) adapted to transmit uplink signals at a frequency associated with at least one of the plurality of synchronization channels. As noted previously, reference to circuitry and/or programming may be generally referred to as logic (e.g., logic gates and/or data structure logic).

The storage medium 810 may represent one or more computer-readable devices for storing programming, such as processor executable code or instructions (e.g., software, firmware), electronic data, databases, or other digital information. The storage medium 810 may be configured and/or implemented in a manner similar to the storage medium 610 described above.

Programming stored by the storage medium 810, when executed by the processing circuit 806, can cause the processing circuit 806 to perform one or more of the various functions and/or process steps described herein. In at least some examples, the storage medium 810 may include synchronization operations 826 adapted to cause the processing circuit 806 to scan a carrier bandwidth for one of a plurality of synchronization channels, as described herein. Thus, according to one or more aspects of the present disclosure, the processing circuit 806 is adapted to perform (independently or in conjunction with the storage medium 810) any or all of the processes, functions, steps and/or routines for any or all of the scheduled entities described herein (e.g., UE 122, 124, 126, 128, 130, 132, 134, 136, 138, 140, and 142, scheduled entity 204a, 204b, 504, 800). As used herein, the term "adapted" in relation to the processing circuit 806 may refer to the processing circuit 806 being one or more of configured, employed, implemented, and/or programmed (in conjunction with the storage medium 810) to perform a particular process, function, step and/or routine according to various features described herein.

Figure 9:
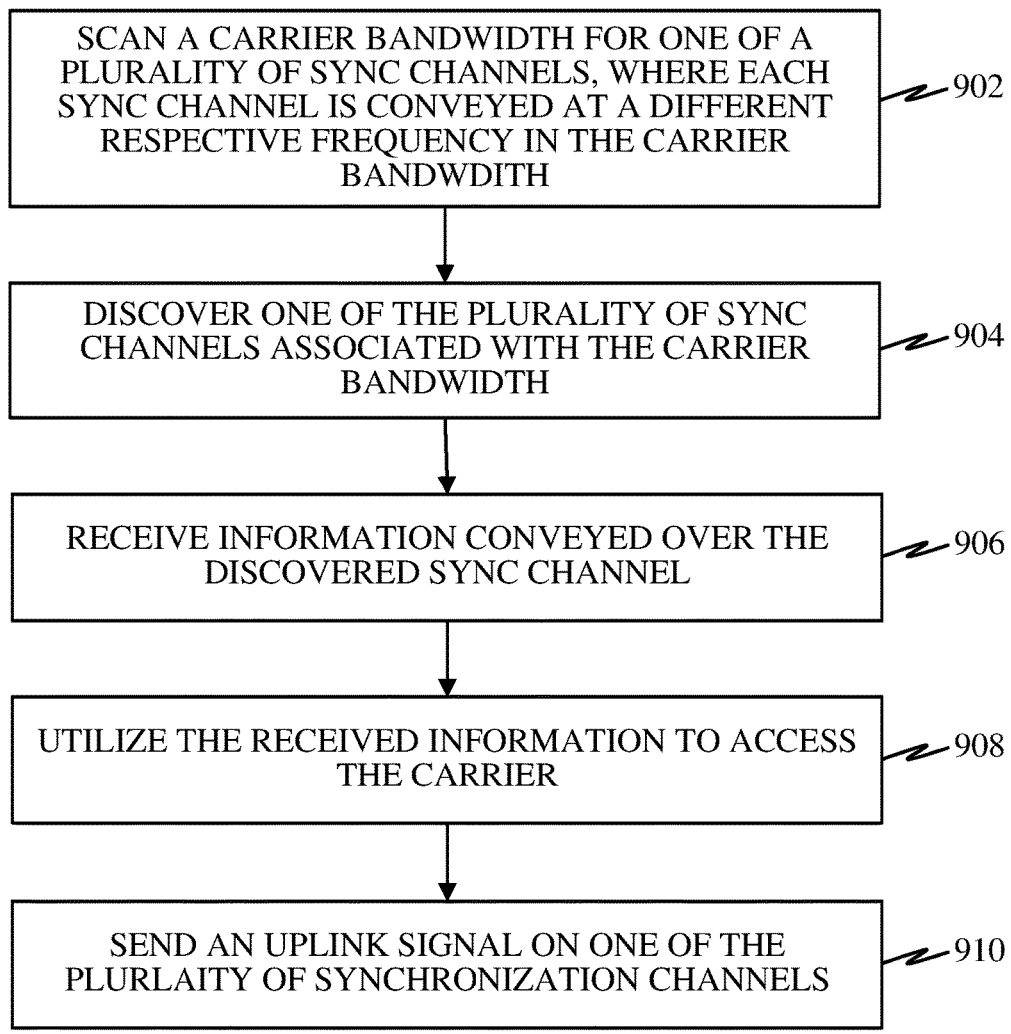
FIG. 9 is a flow diagram illustrating a method operational on a scheduled entity according to at least one example.

FIG. 9 is a flow diagram illustrating at least one example of a method operational on a scheduled entity, such as the scheduled entity 800. Referring to FIGS. 8 and 9, a scheduled entity 800 can scan a carrier bandwidth for one of a plurality of synchronization channels, where each synchronization channel is conveyed at a different respective frequency in the carrier bandwidth at 902. For example, the processing system 802 may include logic (e.g., synchronization circuit/module 820, synchronization operations 826) to scan a carrier bandwidth via the transceiver 814 for one of a plurality of synchronization channels located at different respective frequencies within the carrier bandwidth.

At 904, the scheduled entity 800 may discover one of the plurality of synchronization channels associated with the carrier bandwidth. For example, the processing system 802 may include logic (e.g., synchronization circuit/module 820, synchronization operations 826) to discover one of the plurality of synchronization channels as a result of the scan.

At 906, the scheduled entity 800 can receive information conveyed over the discovered synchronization channel For example, the processing system 802 may include logic (e.g., synchronization circuit/module 820, synchronization operations 826) to receive information via the transceiver 814, where the information is conveyed over the discovered synchronization channel. In some implementations, the information may be received in a primary synchronization signal (PSS) and a secondary synchronization signal (SSS). In some implementations, at least some of the information may further be received in a tertiary synchronization signal (TSS).

At 908, the scheduled entity 800 may utilize the received information to access the carrier. For example, the processing system 802 may include logic (e.g., synchronization circuit/module 820, synchronization operations 826) to utilize the received information in accessing the carrier. According to one or more implementations, the received information can generally include information to enable a scheduled entity 800 to obtain frequency synchronization, timing synchronization, and/or the physical cell or zone ID associated with the carrier. For instance, the received information may include information to facilitate beam synchronization, symbol timing synchronization, frame timing synchronization, frequency synchronization, and physical cell or zone ID, as noted previously.

At 910, the scheduled entity 800 can send an uplink signal on one of the plurality of synchronization channels. For example, the processing system 802 may include logic (e.g., uplink signaling circuit/module 822, uplink signaling operations 828) to transmit an uplink signals on a frequency associated with one of the plurality of synchronization channels. In some implementations, the uplink signal may be transmitted on a frequency associated with the discovered synchronization channel In other implementations, the uplink signal may be transmitted on a frequency associated with another synchronization channel different from the discovered synchronization channel In some implementations, the processing system 802 may include logic (e.g., uplink signaling circuit/module 822, uplink signaling operations 828) to receive information via the transceiver 814 identifying a frequency associated with each of the plurality of synchronization channels, and an indicator authorizing transmission of uplink signals on any synchronization channel of the plurality of synchronization channels. For example, as describe previously, the scheduled entity 800 may utilize information from the discovered synchronization channel to read system information carried in a PDCCH/PDSCH. In some implementations, the system information may indicate the frequencies where each of the plurality of synchronization channels is located, and whether the scheduled entity 800 is authorized to utilize the frequencies associated with any of the synchronization channels for uplink transmissions. When the system information indicates the scheduled entity 800 is authorized to utilize the frequencies associated with any of the synchronization channels for uplink transmissions, the uplink signal may be transmitted on a frequency associated another synchronization channel different from the discovered synchronization channel Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within various systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5, 6, and 8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An apparatus for wireless communication, comprising:
   a transceiver;
   a memory; and
   a processing circuit coupled to the transceiver and the memory, the processing circuit configured to:
      transmit via the transceiver a first synchronization channel, wherein the first synchronization channel is transmitted at a first frequency in a carrier bandwidth; and
      transmit via the transceiver at least one additional synchronization channel, wherein each of the at least one additional synchronization channel is transmitted at a different respective frequency in the carrier bandwidth;
   wherein each different respective frequency is different from the first frequency; and
   wherein as transmitted, the first synchronization channel and each of the at least one additional synchronization channel include frequency synchronization information indicating a same location of a same particular frequency associated with a same channel of the carrier bandwidth.

2. The apparatus of claim 1, wherein each of the first synchronization channel and the at least one additional synchronization channel comprises a primary synchronization signal (PSS) and a secondary synchronization signal (SSS).

3. The apparatus of claim 2, wherein each of the first synchronization channel and the at least one additional synchronization channel further comprises a tertiary synchronization signal (TSS).

4. The apparatus of claim 1, wherein the processing circuit is further configured to receive via the transceiver uplink signals on the first synchronization channel and on the at least one additional synchronization channel.

5. The apparatus of claim 1, wherein the processing circuit is further configured to:
   transmit system information indicating the respective frequency associated with each of the first synchronization channel and the at least one additional synchronization channel, and authorizing uplink transmissions on any of the first synchronization channel and the at least one additional synchronization channel.

6. A method of wireless communication, comprising:
   transmitting a first synchronization channel, wherein the first synchronization channel is transmitted at a first frequency in a carrier bandwidth;
   transmitting at least one additional synchronization channel, wherein each of the at least one additional synchronization channel is transmitted at a respective frequency in the carrier bandwidth; and wherein each different respective frequency is different from the first frequency; and wherein, as transmitted, the first synchronization channel and each of the at least one additional synchronization channel include frequency synchronization information indicating a same location of a same particular frequency associated with a same channel of the carrier bandwidth.

7. The method of claim 6, wherein transmitting the first synchronization channel comprises:

transmitting a primary synchronization signal (PSS) and a secondary synchronization signal (SSS) on the first synchronization channel.

8. The method of claim 7, wherein transmitting the first synchronization channel comprises:

transmitting tertiary synchronization signal (TSS) on the first synchronization channel.

9. The method of claim 6, wherein transmitting the at least one additional synchronization channel comprises:

transmitting a primary synchronization signal (PSS) and a secondary synchronization signal (SSS) on the at least one additional synchronization channel.

10. The method of claim 9, wherein transmitting the at least one additional synchronization channel comprises:

transmitting tertiary synchronization signal (TSS) on the at least one additional synchronization channel.

11. The method of claim 6, further comprising:

receiving uplink signals on each of the first synchronization channel and the at least one additional synchronization channel.

12. The method of claim 6, further comprising:

transmitting system information indicating the respective frequency associated with each of the first synchronization channel and the at least one additional synchronization channel, and authorizing uplink transmissions on any of the first synchronization channel and the at least one additional synchronization channel.

13. An apparatus for wireless communication, comprising:

a transceiver;
a memory; and
a processing circuit coupled to the transceiver and the memory, the processing circuit configured to:
scan via the transceiver a carrier bandwidth for one of a plurality of synchronization channels, wherein each of the plurality of synchronization channels are conveyed at different respective frequencies in the carrier bandwidth, and each of the plurality of synchronization channels includes frequency synchronization information indicating a location of a same particular frequency associated with a channel of the carrier bandwidth;
discover a synchronization channel from among the plurality of synchronization channels associated with the carrier bandwidth;
receive via the transceiver information conveyed over the discovered synchronization channel, wherein the received information conveyed over the discovered synchronization channel includes the frequency synchronization information indicating the location of the particular frequency associated with the channel of the carrier bandwidth; and
utilize the received information to access the carrier.

14. The apparatus of claim 13, wherein the processing circuit configured to receive via the transceiver information conveyed over the discovered synchronization channel comprises the processing circuit configured to:

receive a primary synchronization signal (PSS) and a secondary synchronization signal (SSS) over the discovered synchronization channel.

15. The apparatus of claim 14, wherein the processing circuit configured to receive via the transceiver information conveyed over the discovered synchronization channel comprises the processing circuit configured to:

receive a tertiary synchronization signal (TSS).

16. The apparatus of claim 13, wherein the processing circuit is further configured to:

receive via the transceiver information identifying a frequency associated with each of the plurality of synchronization channels; and
receive via the transceiver an indicator authorizing transmission of uplink signals on any synchronization channel of the plurality of synchronization channels.

17. The apparatus of claim 13, wherein the processing circuit is further configured to transmit via the transceiver an uplink signal on one of the plurality of synchronization channels.

18. The apparatus of claim 17, wherein the processing circuit configured to transmit via the transceiver an uplink signal on one of the plurality of synchronization channels comprises the processing circuit configured to:

transmit the uplink signal via the transceiver on the discovered synchronization channel of the plurality of synchronization channels.

19. The apparatus of claim 17, wherein the processing circuit configured to transmit via the transceiver an uplink signal on one of the plurality of synchronization channels comprises the processing circuit configured to:

transmit the uplink signal via the transceiver on another synchronization channel of the plurality of synchronization channels different from the discovered synchronization channel.

20. The method of wireless communication, comprising:

scanning a carrier bandwidth for one of a plurality of synchronization channels, wherein each of the plurality of synchronization channels are conveyed at different respective frequencies in the carrier bandwidth, and each of the plurality of synchronization channels includes frequency synchronization information indicating a location of a same particular frequency associated with a channel of the carrier bandwidth;
discovering one of the plurality of synchronization channels associated with the carrier bandwidth;
receiving information conveyed over the discovered synchronization channel, wherein the received information conveyed over the discovered synchronization channel includes the frequency synchronization information indicating the location of the particular frequency associated with the channel of the carrier bandwidth; and
utilizing the received information to access the carrier.

21. The method of claim 20, wherein receiving information conveyed over the discovered synchronization channel comprises:

receiving information conveyed in a primary synchronization signal (PSS) and a secondary synchronization signal (SSS) over the discovered synchronization channel.

22. The method of claim 21, wherein receiving information conveyed over the discovered synchronization channel further comprises:

receiving information conveyed in a tertiary synchronization signal (TSS) over the discovered synchronization channel.

23. The method of claim 20, further comprising:
receiving information identifying a frequency associated with each of the plurality of synchronization channels; and
receiving an indicator authorizing transmission of uplink signals on any synchronization channel of the plurality of synchronization channels.

24. The method of claim 20, further comprising sending an uplink signal on one of the plurality of synchronization channels.

25. The method of claim 24, wherein sending the uplink signal on one of the plurality of synchronization channels comprises:
sending the uplink signal on the discovered synchronization channel of the plurality of synchronization channels.

26. The method of claim 24, wherein sending the uplink signal on one of the plurality of synchronization channels comprises:
sending the uplink signal on another synchronization channel of the plurality of synchronization channels different from the discovered synchronization channel.

* * * * *